Dec. 14, 1937.   R. D. DONER   2,102,521
DIFFRACTION GRATING TOOL
Filed Sept. 29, 1936
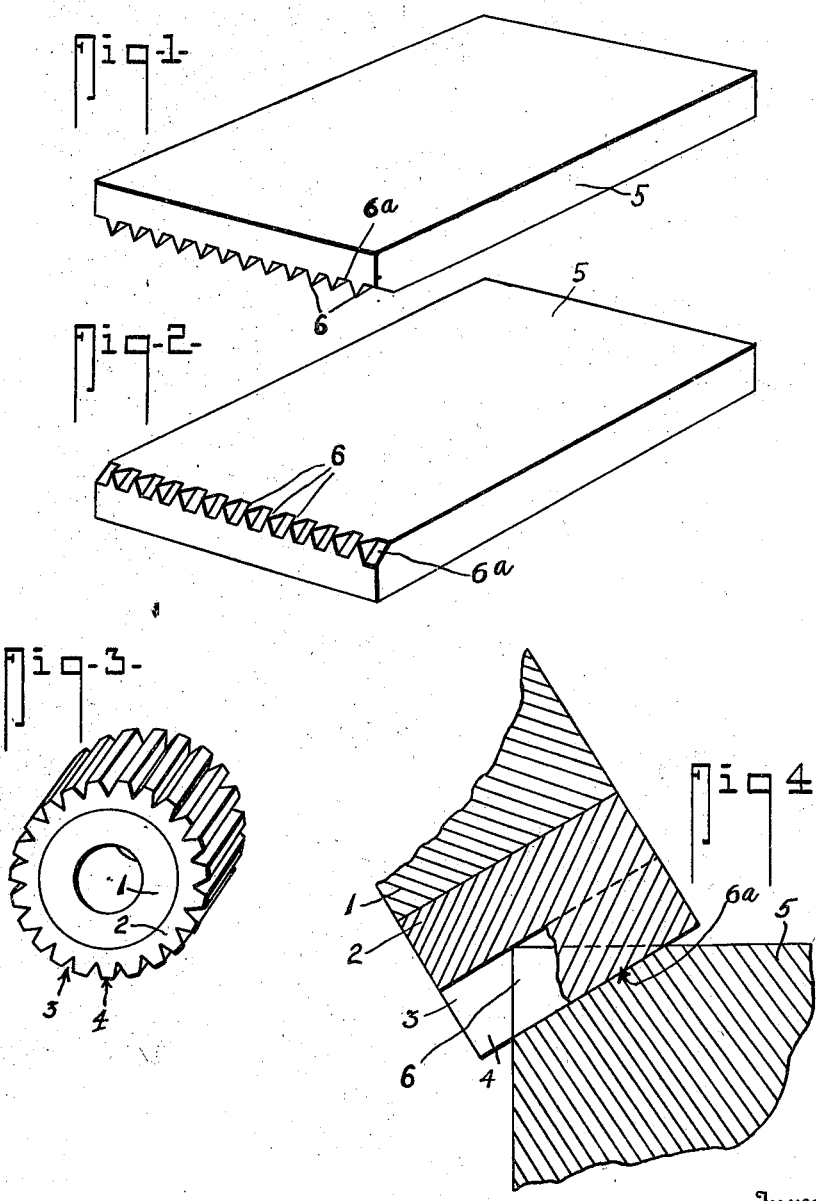
Inventor
Ralph D. Doner
By Albert E. Dieterich
Attorney Patented Dec. 14, 1937

2,102,521

UNITED STATES PATENT OFFICE 2,102,521

DIFFRACTION GRATING TOOL

Ralph Douglas Doner, Auburn, Ala.

Application September 29, 1936, Serial No. 103,197

6 Claims. (Cl. 33—41)

My invention relates particularly to the art of decorating and seeks to provide a simple, inexpensive means by which the surfaces of commercial articles such as cigarette cases, for example, may be cheaply and quickly ruled with a grating so as to give such surface an attractive, colorful and irridescent appearance.

Prior to the present invention the method by which diffraction gratings were produced consisted in ruling with a single diamond point each individual line on the surface. This is still the best way to produce gratings that are to be used for spectrum analysis where exact spacing of lines is necessary.

A grating ruled on certain areas of the exterior surface of a commercial article, such as a metallic cigarette case, and intended to give that area an attractive, colorful and irridescent appearance, does not demand a high degree of accuracy in the spacing of rulings. In fact the appearance of the surface is enhanced by introducing controlled irregularities in the spacings and thus causing overlapping of the spectra and mixing of the pure colors. For such a purpose the one-line-at-a-time method is far too slow and costly. It is to overcome this that my invention has been conceived.

In the drawing:

Fig. 1 is a perspective view of a diffraction grating tool embodying the invention.

Fig. 2 is an inverted perspective view thereof.

Fig. 3 is a perspective view of a master roller or tool for forming the teeth on the grating tool of Figs. 1 and 2.

Fig. 4 is an enlarged detail sectional view showing how the teeth are cut on the bar of the tool of Figs. 1 and 2.

In the drawing in which like numerals indicate like parts in all the figures, I represents the steel core of the master roller on which a hard surface 2 has been welded, say "Stellite". This surface is first ground and polished to a very smooth cylindrical surface and then the roller is mounted on a shaft of a suitable ruling machine which has provisions so mechanically to control the shaft that it will be rotated with the roller intermittently through extremely small angles; between each rotation a diamond point rules a groove in the surface parallel to the axis, thus producing a "cylindrical diffraction grating" care being taken to control the depth of cut, etc. Thus the required grooves 3 and ridges 4 are formed on the roller to constitute the master grating.

The master roller may now be used to form the pyramidal teeth 6 and beveled surfaces 6a alternately disposed with respect to the teeth on the comb blank, 5.

The blank comb is now engaged with the roller at the proper tilt and pressure, and by a rack-and-pinion motion the teeth 6 are formed.

The roller is so designed that when the teeth 6 are formed on the bar 5 (which bar may be straight or curved as desired) the tool will consist of a bar on which are formed very fine teeth, permanently spaced by beveled surfaces 6a and shaped in such a way that when drawn at the proper angle and with the right pressure over a softer surface, all of the rulings and smooth plateaus between rulings are formed simultaneously.

The drawing, of course, shows the tool and roller on a highly magnified scale; in practice the teeth 6 are microscopic in size, say 0.0001 inch between points.

While I have shown and described the preferred method of forming the teeth 6 on the bar 5 other methods may be employed such as cutting them with a diamond point, or stamping them with a chisel-like tool. The method herein first described is the most rapid and efficient method.

From the foregoing it will be seen that the cylindrical grating is itself a tool, a positive grating but a negative replica of a multiplicity of points. The comb is a negative cross section of the grating but a positive reproduction in multiple of the diamond point.

One cylinder may be used to form many combs and each comb may be employed to form many ruled areas, hence the gain in speed of production of such irridescent decorative effects.

From the foregoing it is thought the invention will be clear to those skilled in the art.

What I claim is:—

1. A diffraction grating comb comprising a bar having one edge formed with a multiplicity of microscopic pyramidal teeth whose bases are spaced apart.

2. A diffraction grating tool comprising a bar one edge or which is provided with a plurality of closely spaced microscopic pyramidal cutting teeth whose bases are spaced apart.

3. A diffraction grating comb comprising a bar having a multiplicity of closely spaced, transversely aligned, pyramidal cutting teeth whose bases are spaced apart whereby with a single stroke of the comb a corresponding multiplicity of grating grooves may be cut into a softer surface.

4. A diffraction grating comb comprising a bar having a transverse edge at one end thereof formed with alternately disposed beveled surfaces and pyramidal teeth for purposes described.

5. A diffraction grating comb comprising a bar having a flat face and an end face at approximately right-angles to one another, the meeting edges of said faces having alternately disposed beveled surfaces and pyramidal teeth.

6. A diffraction grating comb comprising a bar having a flat face and an end face at approximately right-angles to one another, the meeting edges of said faces having alternately disposed beveled surfaces and miscroscopic pyramidal teeth.

RALPH DOUGLAS DONER.